United States Patent [19]

Kondo et al.

[11] Patent Number: 5,534,693
[45] Date of Patent: Jul. 9, 1996

[54] OPTICAL DISPLACEMENT DETECTION APPARATUS EMPLOYING DIFFRACTION GRATINGS AND A REFERENCE POSITION SENSOR LOCATED ON THE SCALE

[75] Inventors: Hiroshi Kondo, Yokohama; Kou Ishizuka, Ohmiya; Satoshi Ishii; Yasushi Kaneda, both of Tokyo, all of Japan

[73] Assignee: Canon Kabushiki Kaisha, Tokyo, Japan

[21] Appl. No.: 534,058

[22] Filed: Sep. 26, 1995

Related U.S. Application Data

[63] Continuation of Ser. No. 271,797, Jul. 7, 1994, abandoned.

[30] Foreign Application Priority Data

Jul. 12, 1993 [JP] Japan .................... 5-195130

[51] Int. Cl.$^6$ .................................................. H01J 3/14
[52] U.S. Cl. .......................... 250/237 G; 250/231.16
[58] Field of Search .................. 250/237 G, 237 R, 250/231.16, 231.13, 231.14; 356/375

[56] References Cited

U.S. PATENT DOCUMENTS

| | | | |
|---|---|---|---|
| 4,602,155 | 7/1986 | LaPlante | 250/237 G |
| 4,654,527 | 3/1987 | Schmitt | 250/237 G |
| 4,766,310 | 8/1988 | Michel | 250/237 |
| 5,026,985 | 6/1991 | Ishizuka et al. | 250/237 G |
| 5,057,686 | 10/1991 | Hikawa et al. | 250/237 G |
| 5,059,791 | 10/1991 | Ishizuka et al. | 250/231.17 |
| 5,067,813 | 11/1991 | Ishizuka et al. | 356/351 |
| 5,212,380 | 5/1993 | Sato et al. | 250/237 G |
| 5,260,568 | 11/1993 | Ieki | 250/237 G |
| 5,283,434 | 2/1994 | Ishizuka et al. | 250/237 |

FOREIGN PATENT DOCUMENTS

| | | |
|---|---|---|
| 62-121314 | 6/1987 | Japan . |
| 01-180615 | 12/1989 | Japan . |
| 1474049 | 5/1977 | United Kingdom . |

*Primary Examiner*—Edward P. Westin
*Assistant Examiner*—Steven L. Nichols
*Attorney, Agent, or Firm*—Fitzpatrick, Cella, Harper & Scinto

[57] ABSTRACT

In an optical displacement sensor for measuring a moving state of a moving object by projecting a light beam onto a diffraction grating provided on a surface of a scale connected to the moving object and utilizing diffracted light beams of specific orders from among diffracted light beams diffracted by the diffraction grating, a portion of the light beams incident upon the diffraction grating is reflected at a reflecting region provided on the back of the scale a plurality of times. A photosensor detects a change in the amount of light emanating from a transparent or a light-blocking reference position, formed on a region on the surface of the scale other than the region where the diffraction grating is formed. An output signal from the photosensor is utilized as a reference signal, which provides information relating to the moving state of the moving object.

26 Claims, 15 Drawing Sheets

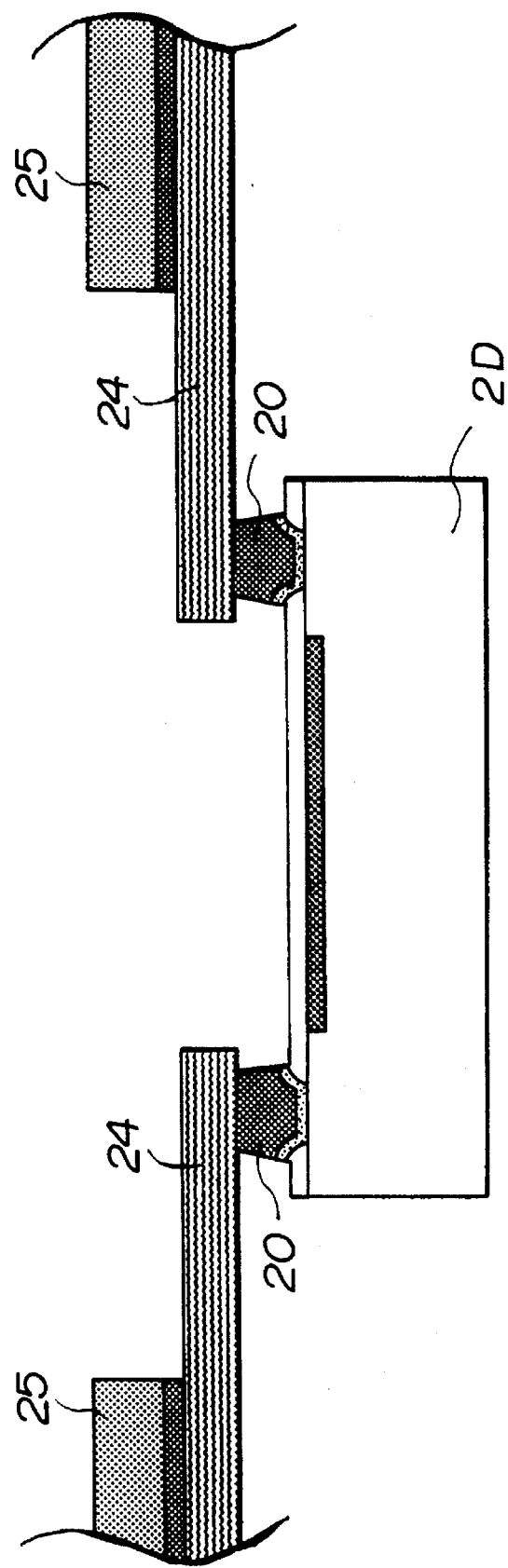

5,534,693

OPTICAL DISPLACEMENT DETECTION APPARATUS EMPLOYING DIFFRACTION GRATINGS AND A REFERENCE POSITION SENSOR LOCATED ON THE SCALE

This application is a continuation of application Ser. No. 08/271,797 filed Jul. 7, 1994, now abandoned.

BACKGROUND OF THE INVENTION

1. Field of the Invention

This invention relates to an optical displacement detection apparatus for measuring displacement information, such as the amount of displacement, the moving speed, or the like, of a moving object, utilizing the fact that when a light beam projected onto the moving object is diffracted and scattered, diffracted and scattered light beams are subjected to phase modulation in accordance with the displacement or the moving speed of the object.

2. Description of the Related Art

As conventional measuring apparatuses for obtaining a physical quantity, such as the displacement, the moving speed, or the like, of a moving object with high accuracy by projecting a light beam onto the object, there are, for example, optical encoders, laser Doppler velocity meters, and laser interferometers. In a field other than that of measuring apparatuses, there are optical pickups for reading digital information recorded in an object, such as a compact disc, as fine projections and recesses by projecting a light beam onto the projections and recesses.

In each of these apparatuses, a light beam emitted from a light-emitting device in accordance with an electrical signal is projected onto an object, the light beam reflected by the object is guided to and sensed by a photosensor via optical components, and the photosensor converts the sensed light beam into an electrical signal representing recorded information.

FIGS. 1 and 2 illustrate a conventional optical encoder disclosed, for example, in Japanese Utility Model Laid-open Application (Kokai) No. 1-180615 (1989). In FIGS. 1 and 2, a light beam emitted from a light-emitting device 42 (denoted by reference numeral 18 in FIG. 2) is converted into a linear light-source array by a slit array 14 (the pitch of which is $P_2$), and is projected onto a grid 12 (the pitch of which is $P_1$) on a scale 40. The grid of the scale 40 is projected onto an index grid 16 (the pitch of which is $P_3$) by the light beam reflected by the grid on the scale 40. The amount of light incident upon a photosensor 48 after passing through the index grid 16 is modulated by the geometrical overlap of the two grids.

Although not disclosed in this publication, the size of the encoder can be reduced by encapsulating the light-emitting device 42 and the photosensor 48 on chips within a receptacle. However, the resolution and the accuracy of an encoder having the above-described detection principle are a few micrometers at most. Such a value is insufficient for realizing high accuracy and high resolution.

FIGS. 3(a) and 3(b) illustrate other conventional optical encoders disclosed in Japanese Patent Laid-open Application (Kokai) No. 62-121314 (1987). Each of these encoders is an example of very effective improvements for reducing the size of the basic optical system of an encoder using three diffraction gratings (disclosed in British Patent Laid-open Application No. 1474049).

A light beam emitted from a light-emitting device L is made into a parallel light beam by a lens 50, and is projected onto and diffracted by a grating having grating constant GK and having scanning fields AF and AF provided on an index scale A, whereby light beams are generated in three directions. Each of these light beams is diffracted by a grating having grating constant GK provided on a scale B, and is returned to the grating GK on the index scale A by being subjected to phase modulation caused by relative movement. Three interference light beams emanate in different directions as a result of diffraction by the grating GK on the index scale A, are condensed onto different positions by the lens 50, and are sensed by photosenors C provided at respective positions.

In the above-described optical encoder, the separation and synthesis of diffracted light beams are performed by the same grating on the index scale A and lens 50. Accordingly, if the pitch of the scale is reduced to about a few micrometers, the optical paths tend to be separated. If it is intended to cover the separated optical paths by a single lens 50, the diameter of the lens 50 must be increased, thereby causing difficulty in reducing the size of the encoder. Furthermore, since signals having phase differences are provided by the shape of the cross section (the step and the ratio of projections to recesses) of the index grating on the index scale A, it is extremely difficult to process the grating if the pitch of the grating is fine. That is, the configuration of the above-described encoder is disadvantageous for realizing the compatibility of a small size o the order of millimeters, and high precision and high resolution on the order of 0.1 μm.

FIG. 4 is a cross-sectional view illustrating the schematic configuration of a linear encoder having a small size and high precision described in U.S. Pat. No. 5,283,434 filed by the assignee of the present application. In FIG. 4, a package, in which a semiconductor laser 1 is sealed, is accommodated in a holder 5. A glass-epoxy substrate 3, in which a threaded hole 4, capable of transmitting light emitted from the semiconductor laser 1, is formed, and on which photosensors 2B and 2C are provided, is laminated at a predetermined position on the holder 5. An optical-unit holder 6 is laminated on the glass-epoxy substrate 3, and an optical unit 7 having a planoconvex lens 8 on one surface thereof, and diffraction gratings 9A, 9B and 9C formed using a replica technique on another surface thereof, is laminated at a predetermined position on the optical-unit holder 6. A scale 10 is provided facing a surface, having the diffraction gratings formed thereon, of the optical unit 7.

In the optical displacement sensor head having the above-described configuration, a divergent laser beam emitted from the semiconductor laser 1 passes through the threaded hole 4, and is incident upon the planoconvex lens 8 of the optical unit 4 to be made into a parallel light beam. The parallel light beam is separated into light beams of 0-order, ± first-order, . . . by the diffraction gratings 9A, 9B and 9C formed on the other surface of the optical unit 7. The respective separated light beams are incident upon the scale 10, and are diffracted by a diffraction grating 10A provided on the scale 10 and are reflected by a reflecting film formed on the scale 10, and return to the diffraction gratings 9A, 9B and 9C on the optical unit 7.

At that time, by optimizing the diffraction angles of respective light beams, the gap between the optical displacement sensor head and the scale, and the thickness of the scale, the 0-order light beam and the ± first-order light beams return to the same region on the optical unit 7, and are synthesized by the diffraction gratings 9A, 9B and 9C on the optical unit 7. At that time, signal light beams interfere with each other with phase differences produced in accordance with the amount of movement of the scale 10, whereby the amounts of respective light beams change. A signal light beam as the result of the synthesis is incident upon the photosensing surfaces of the photosensors 2B and 2C.

By removing a useless space and arranging optimum optical components in respective optical paths according to the above-described configuration, it is possible to obtain a small high-performance optical displacement sensor head.

SUMMARY OF THE INVENTION

In the above-described conventional apparatus, it has been requested to obtain information relating to a reference position with high accuracy without unnecessarily increasing the number of components.

The present invention has been made in order to respond to such a request.

It is an object of the present invention to provide an optical displacement measuring apparatus in which a reference-position signal can be exactly obtained without increasing the number of components of the apparatus.

According to one aspect, the present invention which achieves the above-described object relates to an optical displacement measuring apparatus for measuring relative displacement between two objects. The apparatus comprises a scale having a diffraction grating provided on one of the two objects, for which relative displacement is to be measured, a head unit, provided on the other one of the two objects for (i) projecting a light beam onto the diffraction grating, (ii) detecting diffracted light beams for measurement from the diffraction grating, and (iii) measuring information relating to the relative displacement between the two objects by the detection of the diffracted light beams and a reference-position detection system. The reference-position detection system comprises an optical system for guiding detection light beam, other than the diffracted light beams for measurement, which enter at least one of the scale and a photosensor formed in the scale. The reference-position detection system detects a reference position on the scale on the basis of the detection light beam.

According to another aspect, the present invention relates to a scale for measuring relative displacement between two objects and used in an optical displacement measuring apparatus for measuring information relating to the relative displacement between the two objects, by projecting a light beam onto a diffraction grating from a head unit provided on one of the two objects and detecting diffracted light beams for measurement from the diffraction grating. The apparatus comprises a scale member comprising the diffraction grating, which is provided on the other one of the two objects, and a reference-position detection system comprising an optical system for guiding detection light beam, other than diffracted light beams for measurement, which enter at least one of the scale member and a photosensor formed on the scale. The reference-position detection system detects a reference position on the scale on the basis of the detection light beam, other than the diffracted light beams for measurement.

According to still another aspect, the present invention relates to an optical displacement measuring apparatus for measuring relative displacement between two objects. The apparatus comprises a scale provided on one of the two objects, for which relative displacement is to be measured, a head unit, provided on the other one of the two objects for (i) projecting a light beam onto the scale, (ii) detecting light beams for measurement from the scale and (iii) measuring information relating to the relative displacement between the two objects by the detection of the light beams for measurement and a reference-position detection system. The reference-position detection system comprises an optical system for guiding detection light beam other than the diffracted light beams for measurement, which enter at least one of the scale and a photosensor formed on the scale. The reference-position detection system detects a reference position on the scale on the basis of the detection light beam.

The foregoing and other objects, advantages and features of the present invention will become more apparent from the following description of the preferred embodiments taken in conjunction with the accompanying drawings.

BRIEF DESCRIPTION OF THE DRAWINGS

FIG. 20 is an enlarged cross-sectional view of a principal portion of the encoder shown in FIG. 18.

Like reference numerals have been used for like or corresponding elements, throughout the views.

DESCRIPTION OF THE PREFERRED EMBODIMENTS

First Embodiment

Figure 1:
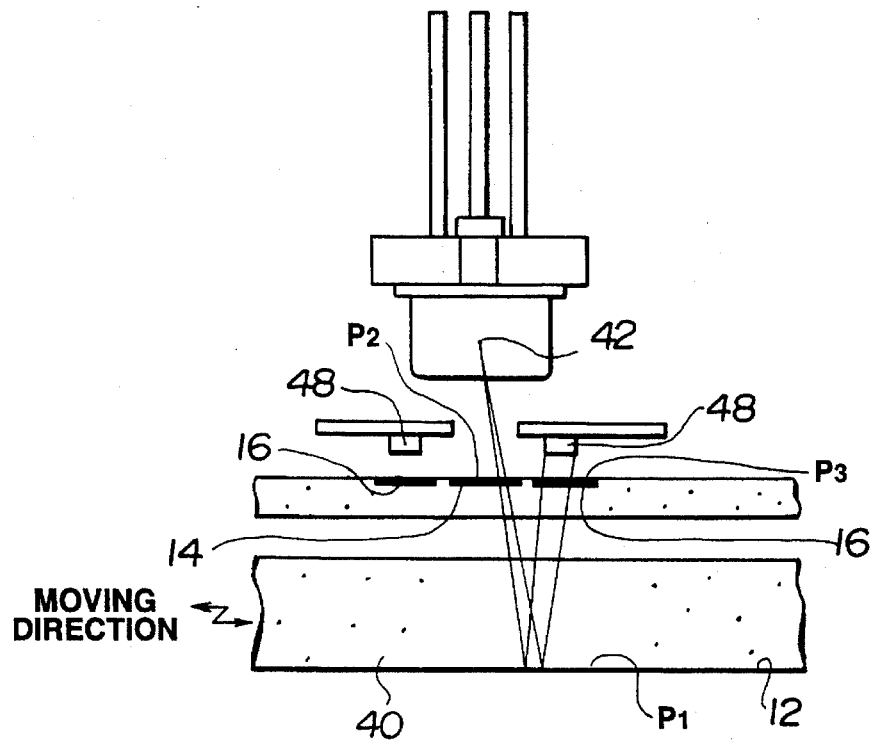
FIG. 1 is a cross-sectional view of a conventional optical encoder.
Figure 2:
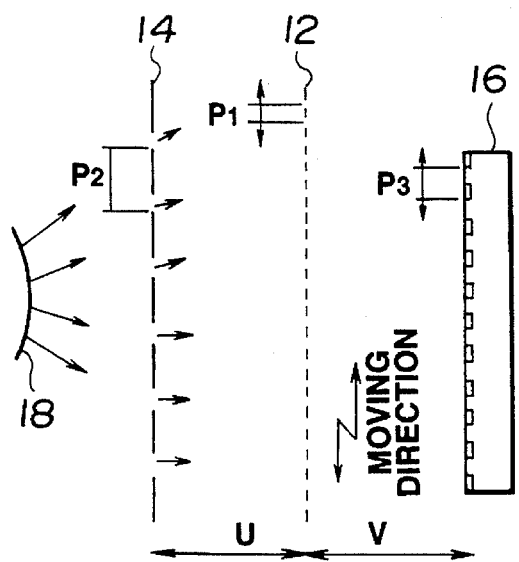
FIG. 2 is a cross-sectional view of a part of the encoder shown in FIG. 1.
Figure 3A:
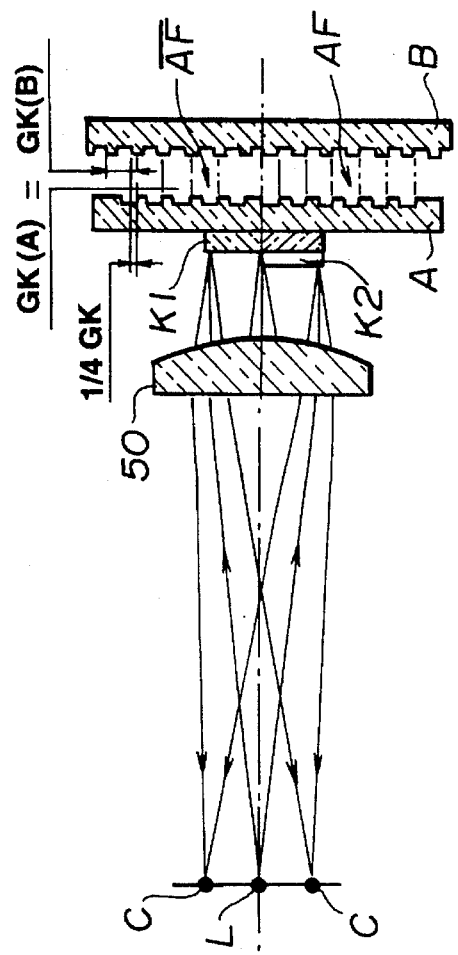
FIGS. 3(a) and 3(b) are diagrams illustrating other conventional optical encoders.
Figure 3A:
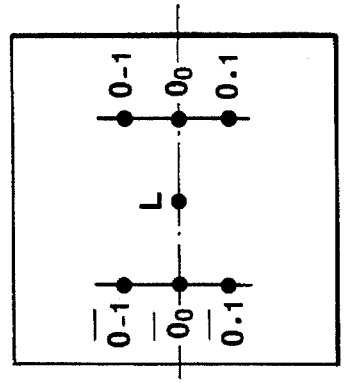
Figure 3B:
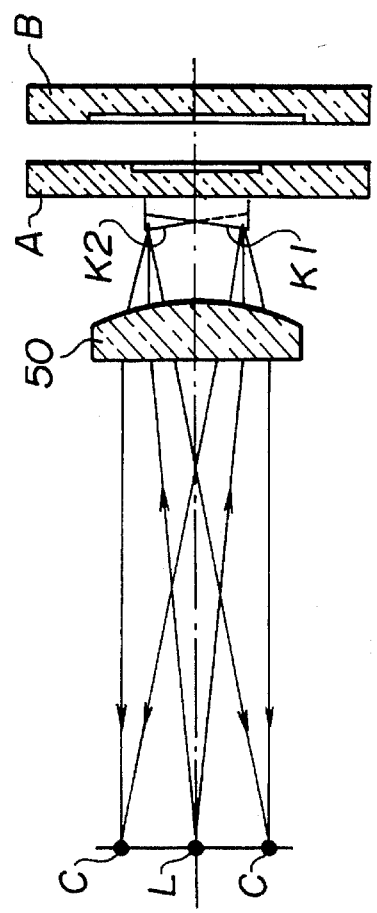
Figure 3B:
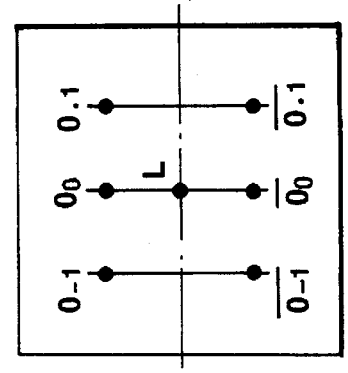
Figure 4:
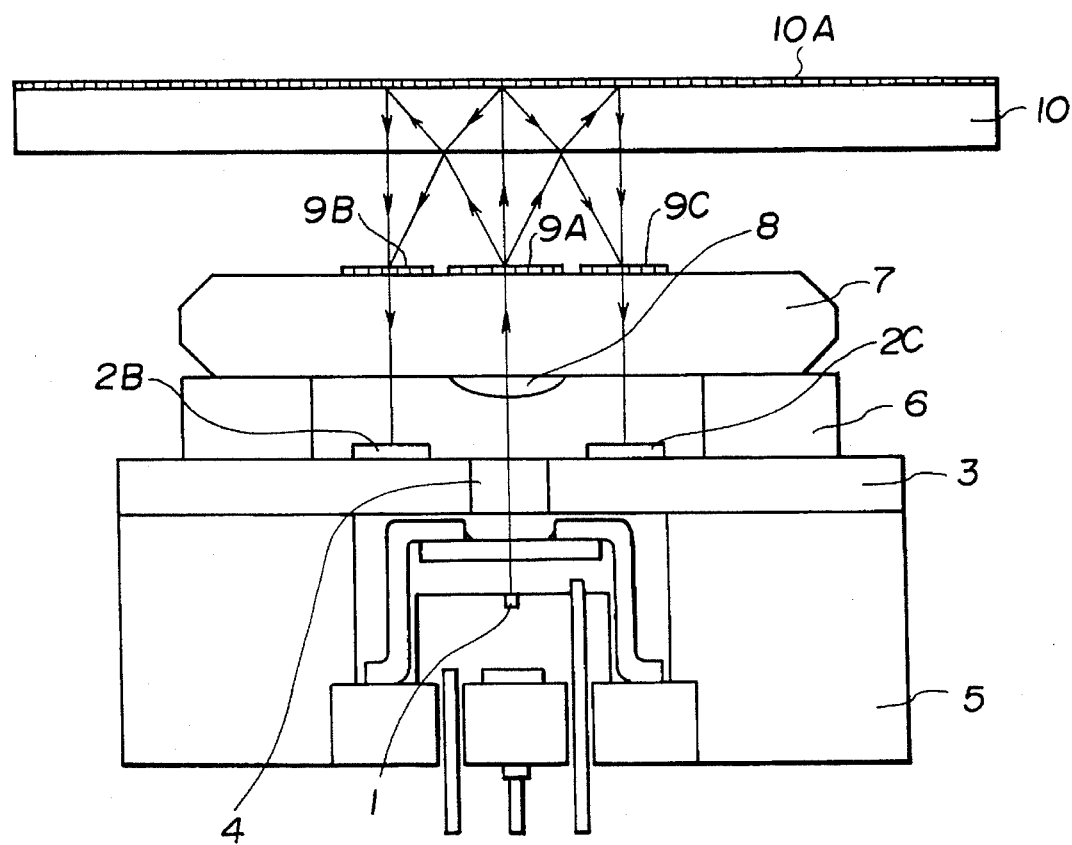
FIG. 4 is a cross-sectional view of a conventional linear encoder.
Figure 5A:
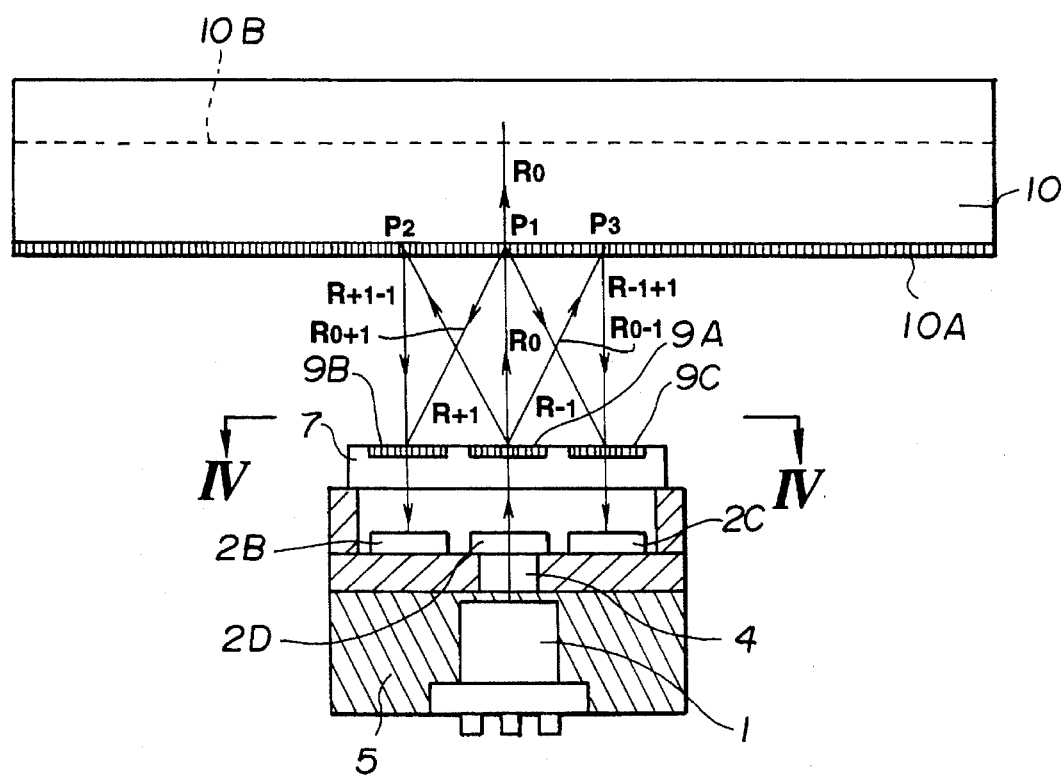
FIG. 5A is a front view illustrating the schematic configuration of an optical displacement sensor according to a first embodiment of the present invention.
Figure 5B:
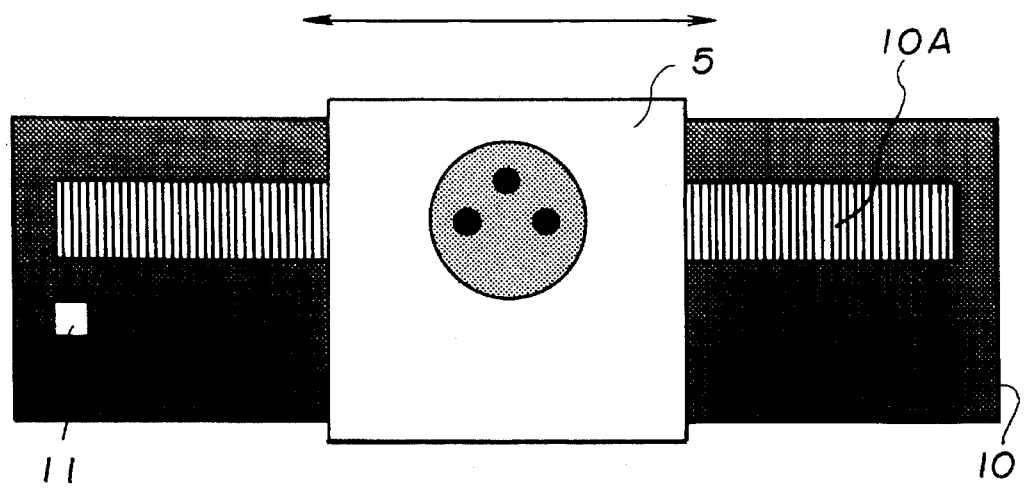
FIG. 5B is a bottom view of the sensor shown in FIG. 5A.
Figure 5C:
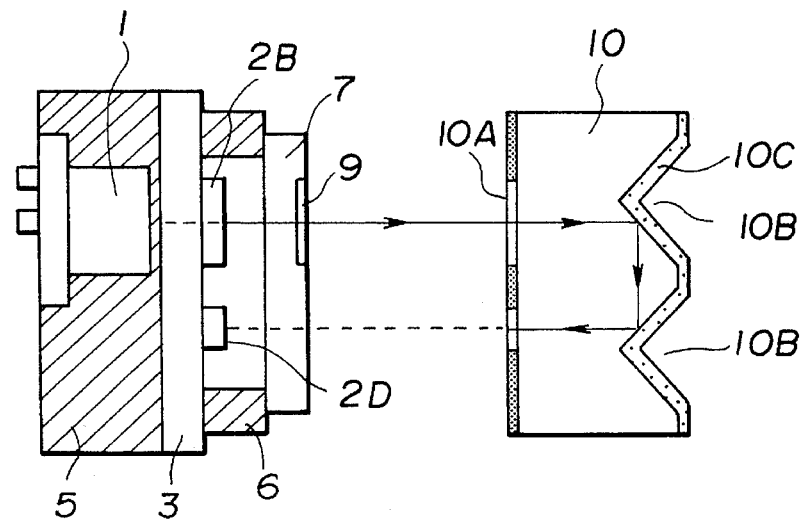
FIG. 5C is a side view of the sensor shown in FIG. 5A.
Figure 5D:
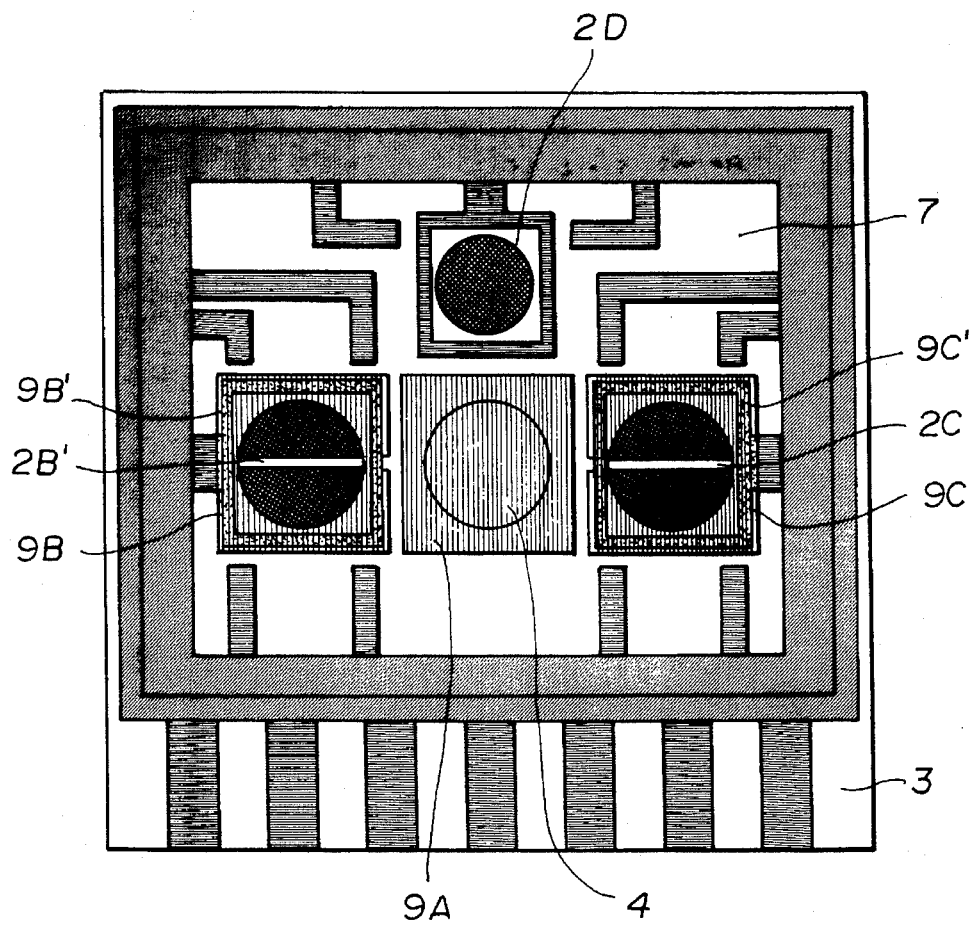
FIG. 5D is an enlarged plan view, taken along the line IV—IV, of the sensor shown in FIG. 5A.

FIG. 5A is a front view illustrating the schematic configuration of an optical displacement sensor according to a first embodiment of the present invention. FIG. 5B is a bottom view of the encoder shown in FIG. 5A. FIG. 5C is a side view of the encoder shown in FIG. 5A. FIG. 5D is an enlarged plan view, taken along the line IV—IV, of the encoder shown in FIG. 5A. In FIGS. 5A through 5D, a light-emitting device 1 comprises a semiconductor laser, a light-emitting diode, or the like.

Each of photosensors 2B, 2C and 2D comprises a photodiode, an avalanche photodiode, a PIN photodiode, a CCD (charge-coupled device), or a photosensing IC (integrated circuit) including a photosensing unit and a circuit for amplifying or processing a photocurrent output from the photosensing unit. There are also shown a glass-epoxy substrate 3, a threaded hole 4 formed in the glass-epoxy substrate 3, a holder 5 for the semiconductor laser, an optical-unit holder (spacer) 6, a glass substrate (optical unit) 7, and a planoconvex lens 8.

Each of diffraction gratings 9A, 9B, 9B', 9C and 9C' is manufactured by one of the following methods: a replica method in which a mold is formed, a UV(ultraviolet-rays)-setting resin is poured onto the mold, a transfer material is placed on the resin, and the resin is cured by irradiating ultraviolet rays, whereby the pattern of the mold is transferred onto the transfer material; an etching method in which a resist is coated on a glass substrate, a pattern is exposed onto the resist using a mask or a reticle, the resist is developed, and the grating is formed by etching; and a method in which a pattern is directly drawn on a resist by EB (electron-beam) scanning, and the resist is developed and etched. The exposed resist may be sujected to hard baking to provide a grating.

In another method, a Cr film is deposited in a vacuum on a glass substrate, a resist is coated thereon, a pattern is exposed onto the resist, the resist is developed and etched, the resist is removed, and a diffraction grating is formed by slits in the Cr film. Reference numeral 10 represents a scale. V-grooves 10B are formed as reflecting regions on the back of the scale 10, and a reflecting film (made of Ag, Au, Al, or the like) is formed on the surface of the V-grooves 10B.

In the present embodiment, a diffraction grating 10A, made of a Cr film, and a reference-position mask 11, where the Cr film is removed at a reference position, are formed on the surface of the scale 10. These components are formed by depositing the Cr film in a vacuum on a glass substrate, coating a resist on the surface of the Cr film, exposing the resist by direct scanning of an EB, developing the resist, etching the Cr film exposed after the development, and finally removing the resist. Two V-grooves 10B are formed on a surface opposite to the surface on which the diffraction grating 10A and the reference-position mask 11 are formed, and a reflecting film 10C is formed by depositing aluminum in a vacuum on the V-grooves 10B.

Next, a description will be provided of the operation of the optical displacement sensor having the above-described configuration. In the present embodiment, a light beam emitted from the semiconductor laser 1 is reaches the back of the glass-epoxy substrate 3 on which the photosensors 2B, 2C and 2D are mounted, passes through the threaded hole 4 provided in the glass-epoxy substrate 3, is subjected to transmission diffraction by the diffraction grating 9A formed on the surface of the glass substrate 7, and emanates From the package by being divided into three diffracted light beams, i.e., a 0-order diffracted light beam $R_0$, a + first-order diffracted light beam $R_{+1}$, and a − first-order diffracted light beam $R_{-1}$.

The light beam $R_0$ directly passing through the diffraction grating 9A is subjected to reflection diffraction at a point P1 on the diffraction grating 10A formed on the scale 10, and is divided into a + first-order diffracted light beam $R_{0+1}$ and a − first-order diffracted light beam $R_{0-1}$, each of which is subjected to phase modulation.

The phase of the + first-order diffracted light beam $R_{0+1}$ is shifted by $+2\pi X/P$, and the phase of the − first-order diffracted light beam $R_{0-1}$ is shifted by $-2\pi X/P$, where X is the amount of movement of the diffraction grating 10A on the scale, and P is the pitch of the diffraction grating 10A.

The + first-order diffracted light beam $R_{0+1}$ as a result of the reflection diffraction at the point P1 on the diffraction grating 10A is subjected to transmission diffraction by the diffraction grating 9B formed on the surface of the glass substrate 7, and is divided into a 0-order diffracted light beam $R_{0+10}$, a − first-order diffracted light beam $R_{0+1-1}$, and the like. The − first-order diffracted light beam $R_{0+1-1}$ is taken out perpendicularly to the diffraction grating's surface, and has a wavefront phase of $+2\pi X/P$.

The − first-order diffracted light beam $R_{0-1}$ is subjected to transmission diffraction by the diffraction grating 9C formed on the surface of the glass substrate 7, and is divided into a 0-order diffracted light beam $R_{0-10}$, a + first-order diffracted light beam $R_{0-1+1}$, and the like. The − first-order diffracted light beam $R_{0-1+1}$ is taken out perpendicularly to the diffraction grating's surface, and has a wavefront phase of $-2\pi X/P$.

If the phase of the arrangement of the diffraction grating 9B is shifted from that of the diffraction grating 9C by P/4, the phase of the wavefront of the + first-order diffracted light beam $R_{0-1+1}$ is further shifted by $-2\pi(P/4)/P=-\pi/2$ to become $-2\pi X/P-\pi/2$.

The light beam $R_{+1}$ as a result of + first-order diffraction by the diffraction grating 9A formed on the surface of the glass substrate 7 is subjected to reflection diffraction at a point P2 on the diffraction grating 10A on the scale 10, and is divided into a − first-order diffracted light beam $R_{+1-1}$, a 0-order diffracted light beam $R_{+10}$, and the like, each of which is subjected to phase modulation. The − first-order diffracted light beam $R_{+1-1}$ is incident upon the diffraction grating 9B with its phase shifted by $-2\pi X/P$. The phase of the wavefront of the 0-order diffracted light beam $R_{+1-10}$ directly passing through the diffraction grating 9B is $-2\pi X/P$.

The light beam $R_{-1}$ as a result of − first-order diffraction by the diffraction grating 9A formed on the surface of the glass substrate 7 is subjected to reflection diffraction at a point P3 on the diffraction grating 10A on the scale 10, and is divided into a + first-order diffracted light beam $R_{-1+1}$, a 0-order diffracted light beam $R_{-10}$, and the like, each of which is subjected to phase modulation. The + first-order diffracted light beam $R_{-1+1}$ is incident upon the diffraction grating 9B with its phase shifted by $+2\pi X/P$. The phase of the wavefront of the 0-order diffracted light beam $R_{-1+1_0}$ directly passing through the diffraction grating 9B is $+2\pi X/P$.

The light beams $R_{+1-1_0}$ and $R_{0+1-1}$, whose optical paths are superposed at the diffraction grating 9B, form an interference light beam, which is incident upon the photosensor 2B. That interference phase at that time is $$(+2\pi X/P)-(-2\pi X/P)=4\pi X/P,$$

and a light-and-dark signal having a period every time the diffraction grating 10A on the scale 10 moves by ½ pitch is generated.

The light beams $R_{-1+1_0}$ and $R_{0-1+1}$, whose optical paths are superposed at the diffraction grating 9C, form an interference light beam, which is incident upon the photosensor 2C. That interference phase at that time is $$(-2\pi X/P-\pi/2)-(+2\pi X/P)=4\pi X/P-\pi/2,$$

a light-and-dark signal having a period every time the diffraction grating 10A on the scale 10 moves by ½ pitch is generated. The light-and-dark timing of the signal is shifted from that of the photosensor 2B by ¼ period.

Since the phase of the arrangement of the diffraction gratings 9B' and 9C' is shifted from that of the diffraction gratings 9B and 9C by P/2, the phases of the wavefronts of light beams from the respective groups of diffraction gratings are shifted by $\pi$ from each other. Accordingly, the light-and-dark timing of a light-and-dark signal generated from the diffraction gratings 9B' and 9C' is shifted from that of the above-described light-and-dark signal by ½ period. The photosensor 2B has divided photosensing surfaces at positions where light beams emanating from the diffraction gratings 9B and 9B' are received. Periodic signals, whose periods are shifted by ¼ period from each other, are obtained from the respective photosensing surfaces according to the above-described principle, and a difference signal representing the difference between these periodic signals is formed. Similarly, a difference signal is formed from the photosensor 2C. The difference signals obtained from the respective photosensors comprise periodic signals whose periods are shifted by a ¼ period from each other, and a light-and-dark signal having a period every time the diffraction grating 10A moves by ½ pitch. Accordingly, the amount and the direction of the movement of the scale 10 are calculated by a signal processing system (not shown) by a well-known method using the two difference signals.

In the present embodiment, the light beam $R_0$ incident upon the diffraction grating 10A on the scale 10 is not only diffracted, but also enters the scale 10 in a direction perpendicular to the diffraction grating 10A. Then, the light beam $R_0$ is reflected by 90 degrees by the side of one of the V-grooves 10B provided at the back of the scale 10, travels to the side of another one of the V-grooves 10B, is further reflected by 90 degrees, and travels toward the surface of the scale 10. At that time, the light beam $R_0$ travels toward a position different from the incident position by being reflected a plurality of times within the scale 10.

The reference-position mask 11 is provided at that reference position so that the light beam $R_0$ reflected within the scale 10 emanates from the scale 10 only when it reaches that reference position when the scale 10 has moved. The reflected light beam $R_0$ emanating from the scale 10 is detected by the photosensor 2D, whose output signal is made a reference-position signal.

The light beams $R_{+1}$ and $R_{-1}$ also enter the scale 10. However, since these light beams are obliquely incident, they can be separated from the reflected light beam $R_0$ by appropriately setting the location and the size of the reference-position mask 11. It is also possible to electrically remove influences of these s-tray light beams based on a difference in the amount of light incident upon the photosensor 2D.

In the present embodiment, the reflected light beam is is arranged to emanate from the scale 10 only when it reaches the reference position. However, it is also possible to provide a Cr film on the surface of the scale 10 so that the reflected light beam does not emanate from the scale 10 only when it reaches the reference position, and to detect a reference-position signal sensing a decrease (fall) in the amount of light.

Second Embodiment

Figure 6A:
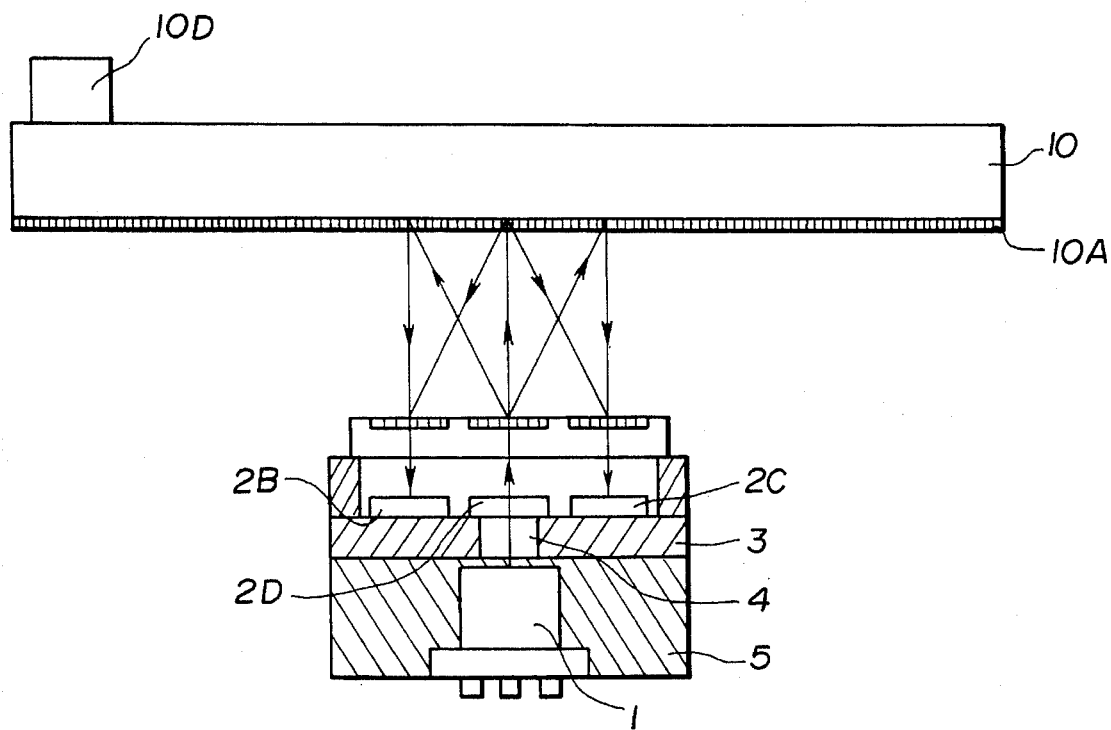
FIG. 6A is a front view illustrating the schematic configuration of an optical displacement sensor according to a second embodiment of the present invention.
Figure 6B:
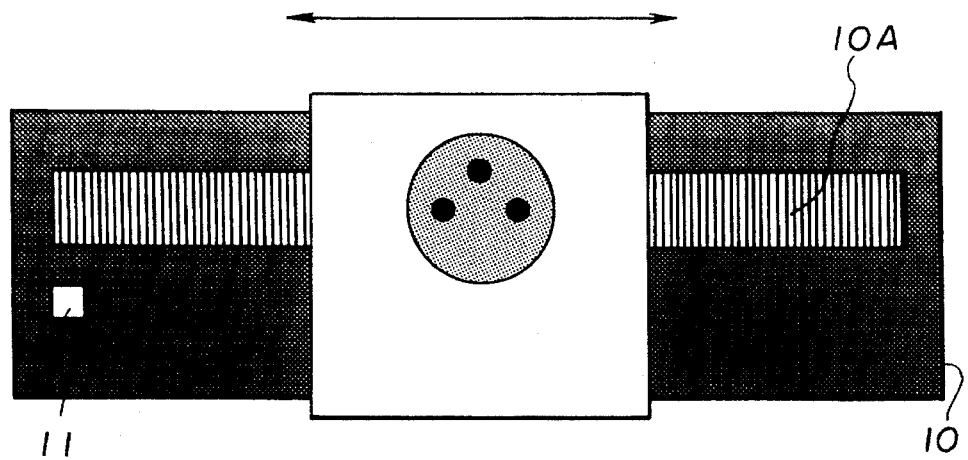
FIG. 6B is a bottom view of the sensor shown in FIG. 6A.
Figure 7:
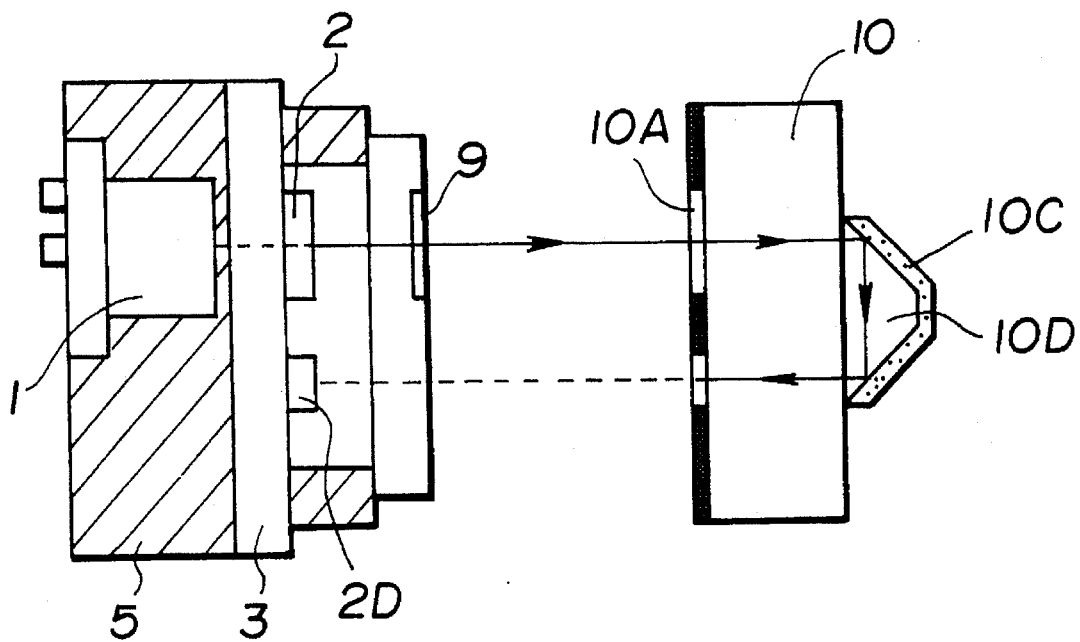
FIG. 7 is a side view of the sensor shown in FIG. 6A.

FIG. 6A is a front view illustrating the schematic configuration of an optical displacement sensor according to a second embodiment of the present invention. FIG. 6B is a bottom view of the sensor shown in FIG. 6A. FIG. 7 is a side view of the sensor shown in FIG. 6A. In FIGS. 6A through the same components as those shown in FIGS. 5A through 5D are indicated by the same reference numerals, and a description thereof will be omitted.

In the present embodiment, a prism 10D is attached to the back of the scale 10 as a member to reflect a light beam entering the scale 10. A reflecting film 10C is formed on oblique surfaces of the prism 10D. Other components are the same as those in the first embodiment.

In the present embodiment, the V-grooves 10B extending along the entire scale used in the first embodiment are not formed, but only the prism 10D is formed on the back of the scale 10 in the vicinity of the reference-position mask 11. This approach is very effective when the strength and accuracy are requested, for example, for a long scale, or when it is intended to provide a thin scale.

Third Embodiment

Figure 8:
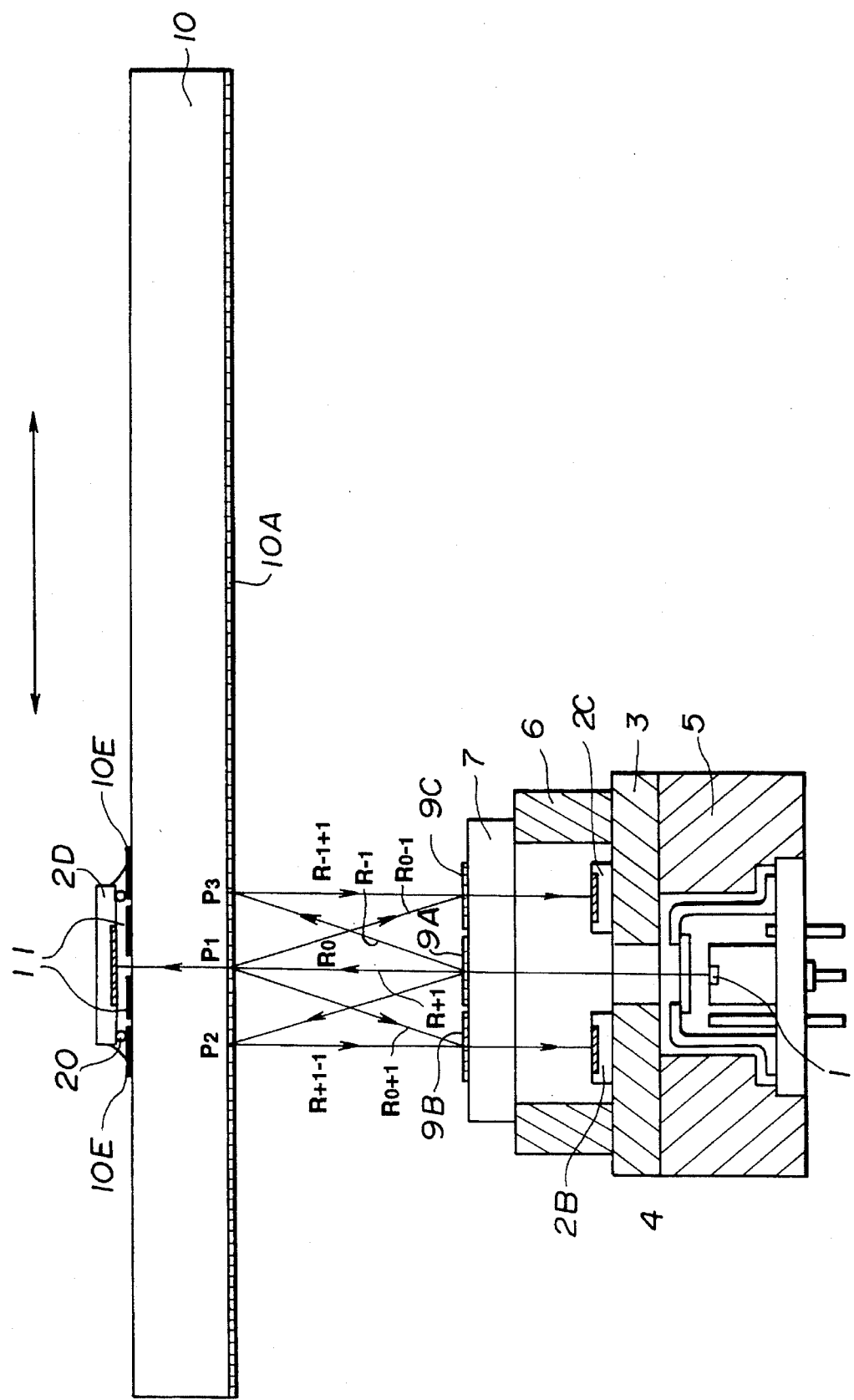
FIG. 8 is a front view illustrating the schematic configuration of an optical displacement sensor according to a third embodiment of the present invention.

FIG. 8 is a front view illustrating the schematic configuration of an optical displacement sensor according to a third embodiment of the present invention. FIGS. 9 through 12 are diagrams illustrating the details of respective portions of the sensor shown in FIG. 8. In FIGS. 8 through 12, the same components as those in the first embodiment shown in FIGS. 5A through 5D are indicated by the same reference numerals, and a description thereof will be omitted.

Figure 9:
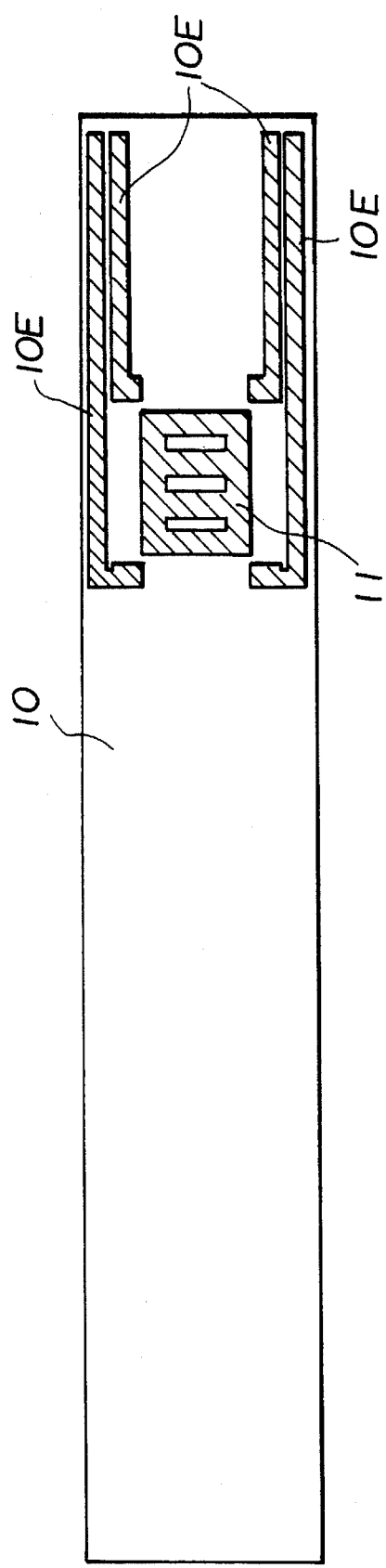
FIG. 9 is a bottom view of a scale shown in FIG. 8.

In the present embodiment, a reference-position mask 11 and an interconnection pattern 10E are formed on the back of the scale 10 by vacuum deposition and etching (FIG. 9). The interconnection pattern 10E comprises a contact layer, made of Cr and Mo, formed on the scale 10, made of glass or quartz, and a layer of Au and Ni, serving as a conductive layer, formed thereon. The conductive layer may be formed by vacuum deposition or plating, after patterning the contact layer.

Figure 10:
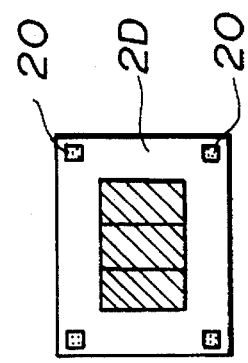
FIG. 10 is a bottom view of a photosensor shown in FIG. 8.

Electrode pads of a photosensor 2D are formed in the following manner. That is, first, Cr and Ni are deposited in a vacuum on the entire surface of the wafer of the photosensors as a common-electrode film, and then a resist is coated thereon. Thereafter, the resist is removed only at the electrode pads to expose the electrode film, and gold bumps 20 are formed on the exposed portions by plating. After forming the gold bumps, the resist and the common-electrode film are removed, and the wafer is divided into respective chips of the photosensors (FIG. 10).

Figure 11:
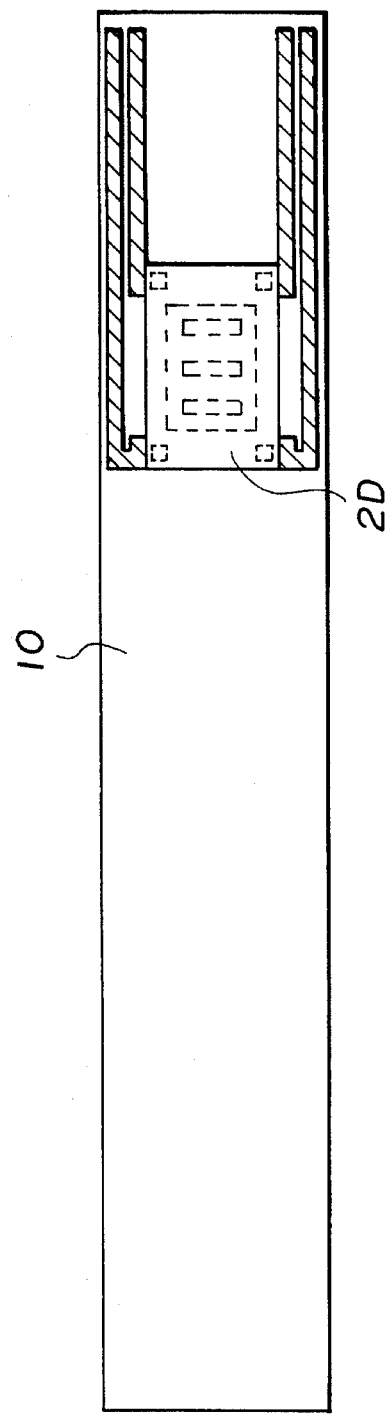
FIG. 11 is a bottom view of the scale on which the photosensor shown in FIG. 10 is mounted.

After aligning the photosensing portion of the photosensor 2D with the reference-position mask 11, and aligning the gold bumps 20 with the interconnection pattern 10E, the photosensor 2D is heated and pressed by a heating head, whereby the gold bumps 20 are connected to the interconnection pattern 10E by being alloyed therewith (FIG. 11).

Figure 12:
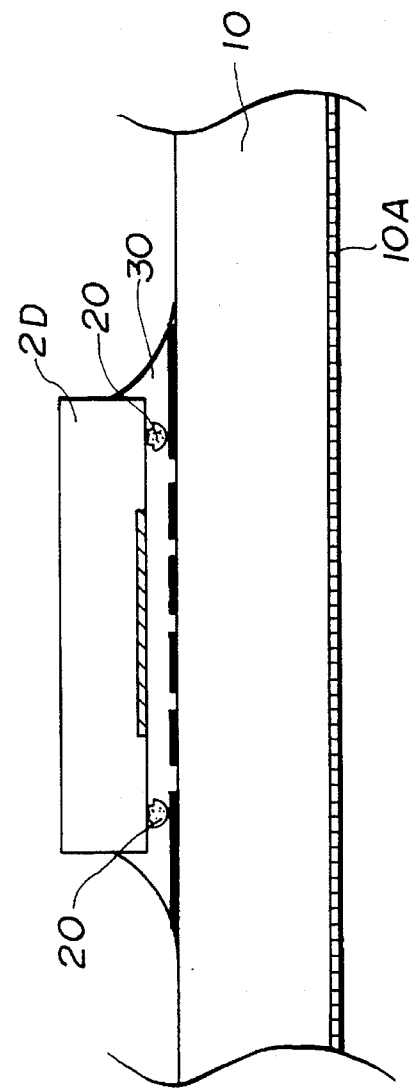
FIG. 12 is an enlarged cross-sectional view of a photosensor-mounting portion shown in FIG. 11.

In order to maintain the reliability of the photosensor 2D mounted on the scale 10, a transparent resin 30 is poured in the gap between the scale 10 and the photosensor 2D, and is cured to seal the photosensor 2D and to obtain the adhesion strength (FIG. 12).

Next, a description will be provided of the operation of the optical displacement sensor having the above-described configuration, though more or less overlapped with the foregoing description.

In the present embodiment, a light beam emitted from a light-emitting device 1 passes through a threaded hole 4 in a glass-epoxy substrate 3, on which photosensors 2B and 2C are mounted, is subjected to transmission diffraction by diffraction gratings 9A, 9B and 9C, and gratings 9B' and 9C' (not shown) formed on the surface of a glass substrate 7, and is divided into three light beams, i.e., a 0-order diffracted light beam $R_0$, a + first-order diffracted light beam $R_{+1}$, and a − first-order diffracted light beam $R_{-1}$, which travel toward the outside.

The light beam $R_0$ directly passing through the diffraction grating 5A is subjected to reflection diffraction at a point P1 on a diffraction grating 10A formed on the scale 10, and is divided into a + first-order diffracted light beam $R_{0+1}$ and a − first-order diffracted light beam $R_{0-1}$, each of which is subjected to phase modulation.

The phase of the + first-order diffracted light beam $R_{0+1}$ is shifted by $+2\pi X/P$, and the phase of the − first-order diffracted light beam $R_{0-1}$ is shifted by $-2\pi X/P$, where X is the amount of movement of the diffraction grating 10A on the scale, and P is the pitch of the diffraction grating 10A.

The + first-order diffracted light beam $R_{0+1}$ is subjected to transmission diffraction by the diffraction grating 9B formed on the surface of the glass substrate 7, and is divided into a 0-order diffracted light beam $R_{0+10}$, a − first-order diffracted light beam $R_{0+1-1}$, and the like. The − first-order diffracted light beam $R_{0+1-1}$ is taken out perpendicularly to the diffraction grating's surface, and has a wavefront phase of $+2\pi X/P$.

The − first-order diffracted light beam $R_{0-1}$ is subjected to transmission diffraction by the diffraction grating 9Cf formed on the glass substrate 7, and is divided into a 0-order diffracted light beam $R_{0-10}$, a + first-order diffracted light beam $R_{0-1+1}$, and the like. The − first-order diffracted light beam $R_{0-1+1}$ is taken out perpendicularly to the diffraction grating's surface, and has a wavefront phase of $-2\pi X/P$.

If the phase of the arrangement of the diffraction grating 9B is shifted from that of the diffraction grating 9C by P/4, the phase of the wavefront of the + first-order diffracted light beam $R_{0-1+1}$ is further shifted by $-2\pi(P/4)/P=-\pi/2$ to become $-2\pi X/P - \pi/2$.

The light beam $R_{+1}$ as a result of + first-order diffraction by the diffraction grating 9A formed on the surface of the glass substrate 7 is subjected to reflection diffraction at a point P2 on the diffraction grating 10A on the scale 10, and is divided into a − first-order diffracted light beam $R_{+1-1}$, a 0-order diffracted light beam $R_{+10}$, and the like, each of which is subjected to phase modulation. The − first-order diffracted light beam $R_{+1-1}$ is incident upon the diffraction grating 9B with its phase shifted by $-2\pi X/P$. The phase of the wavefront of the 0-order diffracted light beam $R_{+1-10}$ directly passing through the diffraction grating 9B is $-2\pi X/P$.

The light beam $R_{-1}$ subjected to − first-order diffraction by the diffraction grating 9A formed on the surface of the glass substrate 7 is subjected to reflection diffraction at a point P3 on the diffraction grating 10A on the scale 10, and is divided into a + first-order diffracted light beam $R_{-1+1}$, a 0-order diffracted light beam $R_{-10}$, and the like, each of which is subjected to phase modulation. The + first-order diffracted light beam $R_{-1+1}$ is incident upon the diffraction grating 9B with its phase shifted by $+2\pi X/P$. The phase of a 0-order diffracted light beam $R_{-1+10}$ directly passing through the diffraction grating 9B is $+2\pi X/P$.

The light beams $R_{+1-10}$ and $R_{0+1-1}$, whose optical paths are superposed at the diffraction grating 9B, form an interference light beam, which is incident upon the photosensor 2B. That interference phase at that time is $$(2\pi X/P)-(-2\pi X/P)=4\pi X/P,$$

and a light-and-dark signal having a period every time the diffraction grating 10A on the scale 10 moves by ½ pitch is generated.

The light beams $R_{-1+10}$ and $R_{0-1+1}$, whose optical paths are superposed at the diffraction grating 9C, form an interference light beam, which is incident upon the photosensor 2C. That interference phase at that time is $$(-2\pi X/P-\pi/2)-(+2\pi X/P)=4\pi X/P-\pi/2,$$

and a light-and-dark signal having a period every time the diffraction grating 10A on the scale 10 moves by ½ pitch is generated. The light-and-dark timing of the signal is shifted from that of the photosensor 2B by ½ period.

Since the phase of the arrangement of the diffraction gratings 9B' and 9C' is shifted from that of the diffraction gratings 9B and 9C by P/2, the phases of the wavefronts of light beams from the respective groups of diffraction gratings are shifted by $\pi$ from each other. Accordingly, the light-and-dark timing of a light-and-dark signal generated from the diffraction gratings 9B' and 9C' is shifted from that of the above-described light-and-dark signal by ½ period. As in the above-described first embodiment, the photosensors 2B and 2C have divided photosensing surfaces at positions where light beams emanating from the two diffraction gratings, whose phases are shifted by P/2 from each other, are received. A difference signal representing the difference between outputs from the respective photosensing surfaces is formed. The amount and the direction of the movement of the scale 10 are calculated using two difference signals obtained in the same manner as described above.

Figure 13A:
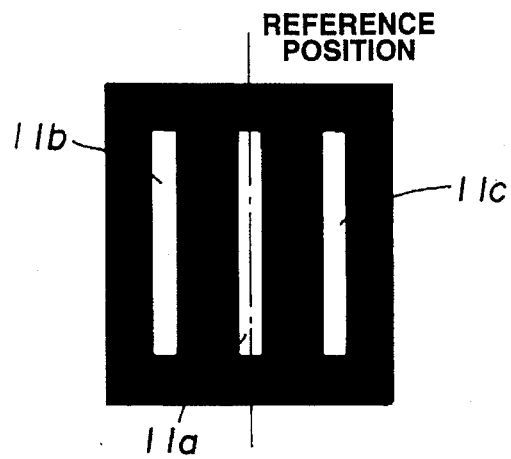
FIGS. 13(a) and 13(b) are diagrams illustrating the relationship between a slit at a reference position and a signal output from the photosensor.
Figure 13B:
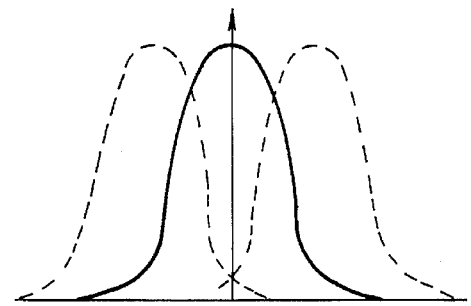

In the present embodiment, the 0-order diffracted light beam $R_0$ incident upon the diffraction grating 10A on the scale 10 not only is subjected to reflection diffraction but also enters the scale 10. When the scale 10 moves by an amount such that the light beam $R_0$ reaches the reference position, the light beam $R_0$ is incident upon the photosensing surface of the photosensor 2D through a slit 11a in the reference-position mask 11. At that time, as shown in FIG. 13(a), transparent slits 11b and 11c are provided at two sides of the slit 11a. By dividing the photosensing surface of the photosensor 2D so as to correspond to the slits, output signals as shown in FIG. 13(c) (the solid line represents an output from the central photosensing surface, and the broken lines represent outputs from the photosensing surfaces at two sides of the central photosensing surface) are obtained from the photosensor 2D, so that in addition to the amount of displacement which has been described above, the direction of the movement of the scale 10 when the light beam $R_0$ reaches the reference position can be recognized.

In a method in which a light beam reflected by the scale 10 is used as a reference signal for detecting the movement of the scale 10 linked with unstable movement (yawing, pitching, rolling, or the like) of an object to be detected, the angle of reflection may change, whereby the optical path of the light beam may change. In the present embodiment, however, since the reference-position mask 11 and the photosensor 2D are provided on the scale 10, accuracy in the reference-position signal is not degraded by the above-described unstable movement.

Figure 14A:
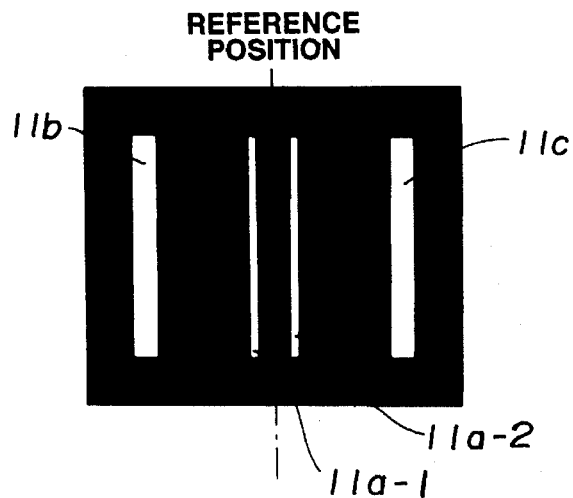
FIGS. 14(a) and 14(b) are diagrams illustrating the relationship between slits at a reference position and a signal output from the photosensor.
Figure 14B:
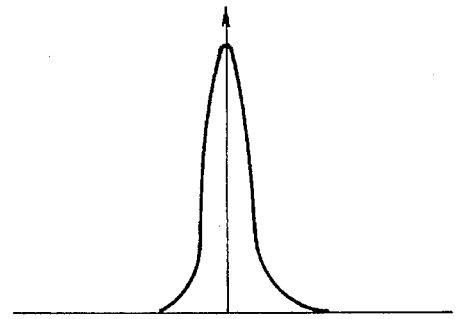

By providing double slits 11a-1 and 11a-2 shown in FIG. 14(a) in order to optimize the function of the slit 11a, and detecting an interference light beam caused by the double slits 11a-1 and 11a-2 by the photosensor 2D, an output signal From the photosensor 2D as shown in FIG. 14(b) is obtained, so that the reference position can be detected more precisely.

The + first-order light beam $R_{+1}$ and the − first-order light beam $R_{-1}$ also enter the scale 10, and pass through the slit in the reference-position mask 11 as a result of the movement of the scale 10. However, the 0-order diffracted light beam $R_0$ can be electrically separated from these light beams utilizing a difference in the intensities of the light beam $R_0$ and these light beams.

Fourth Embodiment

Figure 15:
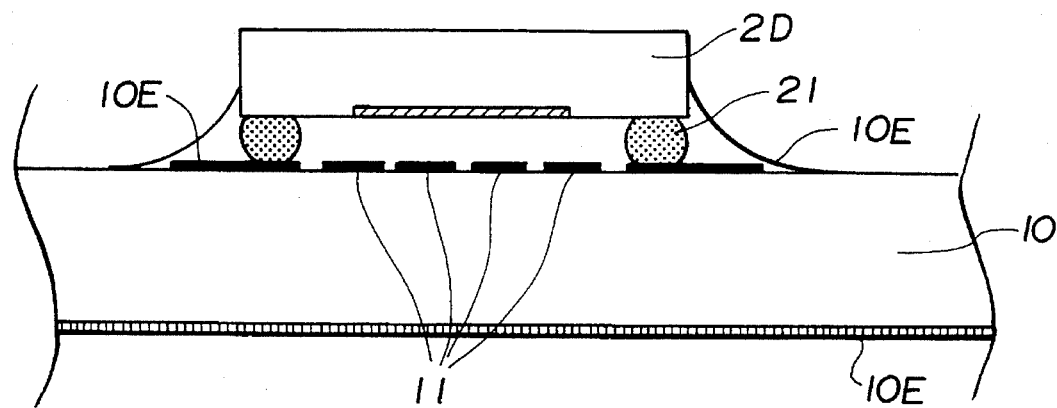
FIG. 15 is an enlarged cross-sectional view illustrating the schematic configuration of a principal portion of an optical encoder according to a fourth embodiment of the present invention.

FIG. 15 is an enlarged cross-sectional view illustrating the schematic configuration of a principal portion of an optical encoder according to a fourth embodiment of the present invention. In FIG. 15, the same components as those in the above-described embodiments are indicated by the same reference numerals, and a description thereof will be omitted. In the present embodiment, flip-chip connection using solder bumps 21 is used as the method of connecting the photosensor 2D to the interconnection pattern 10E provided on the scale 10.

The solder bumps 21 are formed on the electrode pads of the photosensor 2D by contacting a metal mask, having holes only at portions corresponding to the electrode pads, to the wafer of photosensors 2D, sequentially depositing in a vacuum a contact layer of Cr or Ti, a diffusion layer of Cu, and a thin gold layer for protecting oxidation on the disclosed surface of the wafer to form BLM (ball limiting metallurgy).

Thereafter, a solder layer (Sn formed on Pb) is deposited in a vacuum to form solder bumps having a trapezoidal shape on the wafer. Then, the metal mask is removed, and the wafer is passed through a reflow process in a hydrogen atmosphere, so that the solder melts to have a semicircular shape by its surface tension. The wafer is then divided into respective chips of photosensors 2D.

The photosensor 2D, having the solder bumps 21, formed in the above-described manner thereon, is aligned with connecting portions of the interconnection pattern 10E, and the reference-position mask 11 is aligned with the photosensing portion of the photosensor 2D, whereby the photosensor 2D is mounted on the scale 10. The photosensor 2D is connected to the interconnection pattern 10E by alloying the solder bumps 21 with the interconnection pattern 10E by being passed through the reflow process.

In the present embodiment, the solder bumps 21 are used for connecting the photosensor 2D to the scale 10. Hence, when a failure occurs after mounting the photosensor 2D on the scale 10, the photosensor 2D can be removed from the scale 10 by being heated, and therefore the production yield can be increased. In addition, when a plurality of reference positions are provided on a single scale 10, all photosensors 2D can be connected in a single fellow process, whereby the time required for a connection process can be shortened. Since other functions of the present embodiment are the same as those in the above-described third embodiment, a description thereof will be omitted.

Fifth Embodiment

Figure 16:
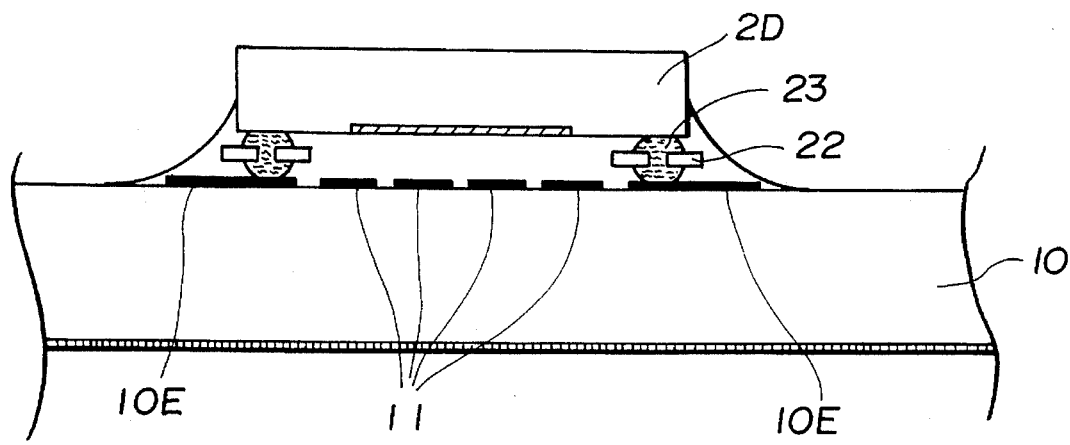
FIG. 16 is an enlarged cross-sectional view illustrating the schematic configuration of a principal portion of an optical encoder according to a fifth embodiment of the present invention.

FIG. 16 is an enlarged cross-sectional view illustrating the schematic configuration of an optical encoder according to a fifth embodiment of the present invention. In FIG. 16, the same components as those in the above-described embodiments are indicated by the same reference numerals, and a description thereof will be omitted.

In the present embodiment, the connection of the photosensor 2D to the interconnection pattern 10E provided on the scale 10 is performed using gold bumps 23 buried in a polyimide film 22. A method of manufacturing an electric connection member, comprising the polyimide film 22 and the gold bumps 23 buried therein, will be described with reference to FIG. 16.

Figure 17:
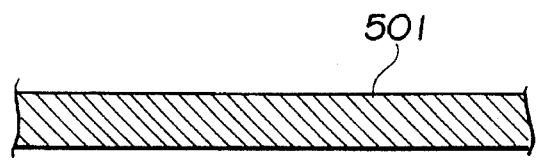
FIGS. 17(a) through 17(f) are diagrams illustrating a process for manufacturing an electric connection member.
Figure 17:
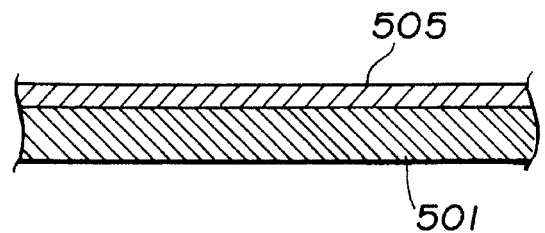
Figure 17:
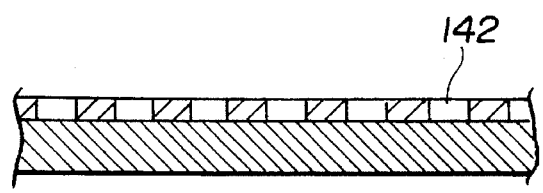
Figure 17:
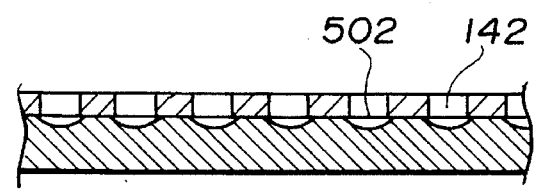
Figure 17:
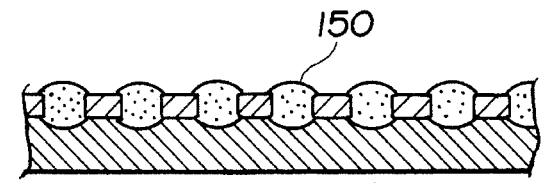
Figure 17:
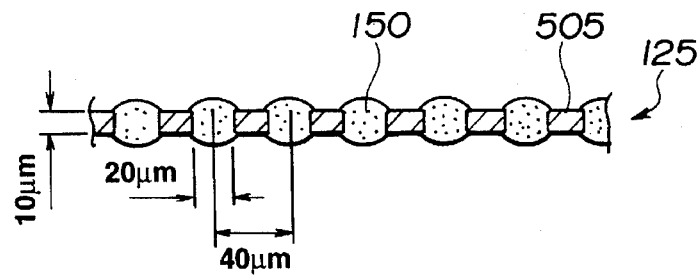

In order to manufacture the above-described electric connection member, first, as shown in FIG. 17(a), a metallic sheet 501 is prepared. Next, as shown in FIG. 17(b), a photosensitive resin (polyimide resin (PI)) 505 is coated on the metallic sheet 501 using a spin coater, and is subjected to prebaking at a temperature near 100° C. Thereafter, as shown in FIG. 17(c), the photosensitive resin 505 is irradiated with light (ultraviolet light), and is developed after being exposed for a required time period. At that time, the polyimide resin remains at exposed portions, and is removed at non-exposed portions by the development to form holes 142. Thereafter, the metallic sheet 501 is heated to 200°–400° C. to form imide from the polyimide resin.

Next, as shown in FIG. 17(d), the metallic sheet 501 having the polyimide resin, comprising imide, thereon is soaked in a metal-etching liquid to etch the metallic sheet 501 at and in the vicinity of the bases of the holes 142 to form recesses 502. Thereafter, as shown in FIG. 17(e), metallic plating is performed using the metallic sheet 501 as a common electrode, and gold 150 is buried in the holes 142. The metallic plating is performed until bumps are formed on the surface of the polyimide layer. Then, as shown in FIG. 17(f), the metallic sheet 501 is removed by etching to provide an electrical connection member 125.

In the electrical connection member 125 provided in the above-described manner, the gold 150 serves as electric conductive members, and the polyimide resin 505 constitutes a holding member. If the thickness of the polyimide resin is assumed to be 10 μm, the sizes of respective components of the electrical connection member 125 can be reduced such that the diameter of the columnar portions of the gold 150 equals 20 μm, the pitch between adjacent bumps equals 40 μm, and the amount of protrusion of the gold bumps at the front and back sides equals about 5 μm.

These sizes can be freely changed within a range permitted by resolution in photolithography depending on the thickness of the photosensitive polyimide resin. Accordingly, two kinds of arrangements, i.e., a regular dense arrangement independent of the arrangement of electrodes to be connected and an arrangement in one-to-one correspondence with electrodes to be connected, can be adopted for the gold bumps of the electrical connection member 125.

Next, a description will be provided of a method for connecting the photosensor 2D to the interconnection pattern 10E on the scale 10 in the present embodiment. In the present embodiment, bumps as shown in the above-described fourth embodiment are not directly formed on the electrode pads of the photosensor 2D.

Instead, the electrical connection member 125 is inserted between the photosensor 2D and the interconnection pattern 10E on the scale 10, is aligned with each of them, and is pressed while being heated by a heating head. Thus, the gold bumps 23 of the electrical connection member are connected to the electrode pads of the photosensor 2D and the interconnection pattern 10E by being alloyed therewith. If the polyimide resin is removed from a portion of the electrical connection member 125 corresponding to the photosensing portion of the photosensor 2D, a decrease in the amount of light due to the electrical connection member 125 can be prevented.

The connection of the electrical connection member 125 to the photosensor 2D and the interconnection pattern 10E may be performed at a time as described above, or first, the electrical connection member 125 may be connected to one of the photosensor 2D and the interconnection pattern 10E, and thereafter connected to the other.

The connection of the electrical connection member 125 to the photosensor 2D and the interconnection pattern 10E may be performed using alloy connection as described above, or may be performed by pouring an adhesive between the electrical connection member 125, and the photosensor 2D and the interconnection pattern 10E, applying pressure, and curing the adhesive, whereby the electrical connection member 128 is pressed against the photosensor 2D and the interconnection pattern 10E to provide electrical connection. In this approach, it is possible to effect the connection at a temperature lower than the heating temperature for alloy formation, and to prevent damage (warp and cracks) to the scale 10 at a high temperature.

In the present embodiment, by performing the connection using the electrical connection member 125, it is unnecessary to directly form bumps on the photosensor 2D as in the fourth embodiment, whereby it is possible to prevent a decrease in the production yield of the photosensor 2D and an increase in the cost of the photosensor 2D, and to freely design the connection member. Hence, any type of photosensor 2D can be mounted. Other functions are the same as in the above-described third embodiment.

Sixth Embodiment

Figure 18:
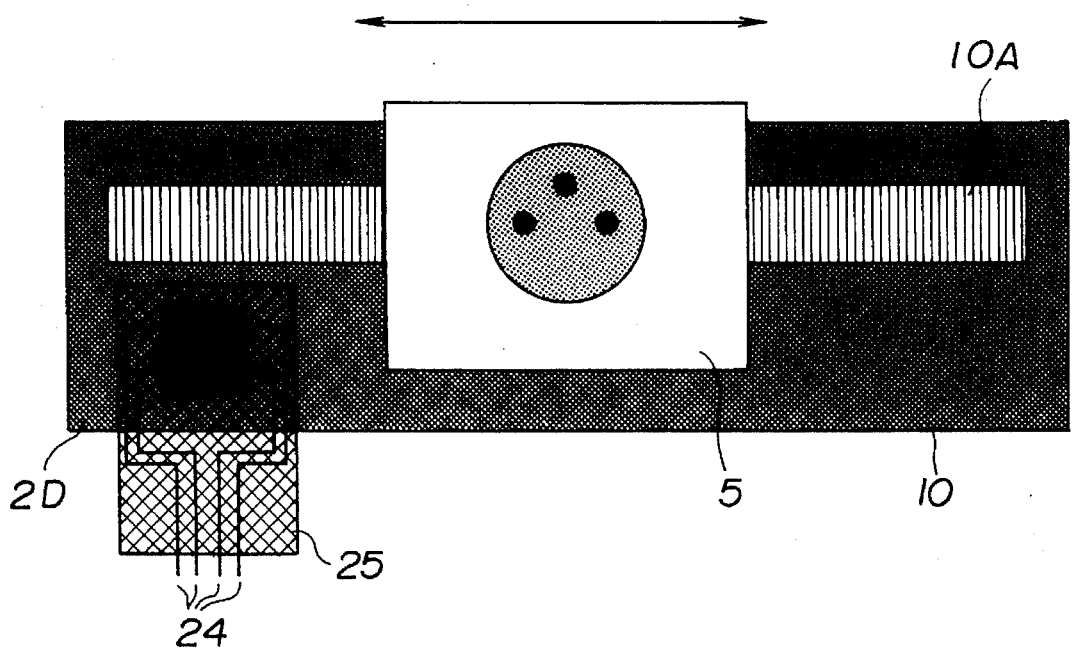
FIG. 18 is a bottom view illustrating the schematic configuration of an optical encoder according to a sixth embodiment of the present invention.
Figure 19:
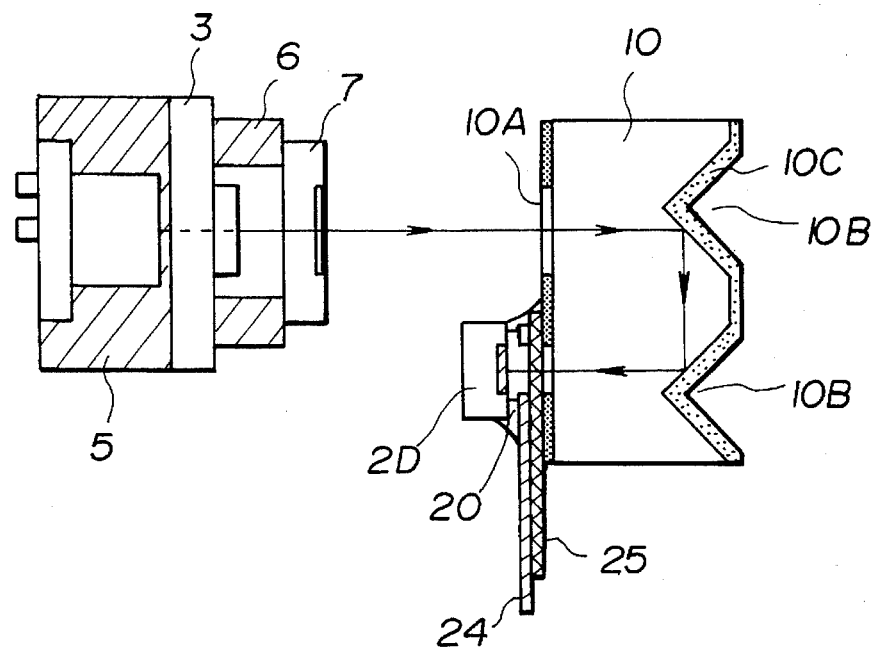
FIG. 19 is a cross-sectional view of the encoder shown in FIG. 18.

FIG. 18 is a bottom view illustrating the schematic configuration of an optical encoder according to a sixth embodiment of the present invention. FIG. 19 is a cross-sectional view of the optical encoder shown in FIG. 18. In FIGS. 18 and 19, the same components as those of the third embodiment shown in FIG. 8 are indicated by the same reference numerals, and a description thereof will be omitted.

In the present embodiment, V-grooves 10B are formed on the back of the scale 10, and a film 10C having high reflectivity made of Ag, Al, Au, or the like is deposited in vacuum on the surface of the V-grooves 10B. The 0-order light beam incident upon the diffraction grating 10A of the scale 10 repeats reflection by the reflecting film 10C, and travels toward the surface of the scale 10.

At that time, by being reflected at the back of the scale 10 a plurality of times, the position where the light beam emanates from the surface of the scale 10 differs from the region where the diffraction grating 10A is formed. Accordingly, by forming a reference-position mask 11 at this region, and providing a photosensor 2D on the reference-position mask 11, a reference-position signal can be detected.

In the present embodiment, as shown in FIG. 20, the photosensor 2D is mounted on a TAB (tape automated bonding) tape, comprising a copper-foil pattern 24 formed on a polyimide film 25. Gold bumps 20 as those described in the third embodiment are formed on eletrode pads of the photosensor 2D, and the gold bumps 20 are connected to inner leads of the copper-foil pattern 24 by thermocompression bonding. In the case of an ordinary TAB tape, the semiconductor device is thereafter sealed by being subjected to potting using a resin.

In the present embodiment, however, the reference-position mask 11 on the scale 10 is subjected to potting using a transparent resin. The transparent resin is cured by applying pressure, and heating or irradiating ultraviolet rays after performing alignment of the photosensor 2D mounted on the TAB tape. Thus, the photosensor 2D is sealed and fixed. A thermosetting resin, a thermoplastic resin, an ultraviolet-light-setting resin, or the like can be used as the resin in the above-described process.

In the present embodiment, since the photosensor is not provided on the back of the scale 10, the scale 10 can be disposed in close contact with an object to be measured. Furthermore, by using a TAB tape having a desired shape, the TAB tape can also function as a cable for taking out a signal from the photosensor provided on the scale.

As described above, by providing the configuration that a part of the 0-order diffracted light beam incident upon a diffraction grating on a scale is reflected a plurality of times by a prism or V-grooves provided on the back of the scale, so that the light beam emanates from a position different from the incident position to the outside of the scale, a mask capable of reemanating or blocking the light beam only at that reference position is provided, and a change in the reemanating light beam is detected by a photosensor to provide a reference-position signal, it is possible to increase the efficiency of utilization of the emanating light beam, to prevent an increase in the size of a displacement-sensor head, in the number of components and in the production cost, and to provide a very small high-performance optical displacement sensor capable of outputting a reference-position signal.

Furthermore, by providing the configuration that the 0-order light incident upon the scale is used, and a mask having a transparent or light-blocking region at a reference position and the photosensor provided thereon are mounted on the scale, it is possible to provide a small-size optical displacement sensor capable of outputting a reference-position signal.

Moreover, by providing the configuration that the reference-position mask and the photosensor are provided on the scale as one body, accuracy in a reference-position signal is not degraded compared with a conventional method for detecting the reference-position signal using a reflected light beam from the scale, even if an unstable movement (yawing, pitching, rolling, or the like) of the scale linked with a moving object is present. That is, since the light beam entering the scale is detected without being modified, and the photosensor moves together with the scale, accuracy in the detection of the reference-position signal is not degraded.

In addition, since the photosensor can be provided at an arbitrary position on the scale, and a plurality of photosensors can be provided on a single scale, a reference position can be detected with a slight movement.

By providing the configuration that the photosensor is provided on the surface of the scale, it is possible to dispose the scale in close contact with an object to be measured, and to further reduce the size of the optical displacement sensor capable of outputting a reference-position signal.

By providing the configuration that a plurality of slits are formed at the region of the reference position, the reference position can be detected more precisely.

The individual components shown in outline in the drawings are all well known in the optical displacement detection apparatus arts and their specific construction and operation are not critical to the operation or the best mode For carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical displacement measuring apparatus for measuring relative displacement between two objects, said apparatus comprising:

a scale having a diffraction grating provided on one of the two objects, for which relative displacement is to be measured;

a head unit, provided on the other one of the two objects, for (i) projecting a light beam onto the diffraction grating, (ii) detecting diffracted light beams for measurement from the diffraction grating, and (iii) measuring information relating to the relative displacement between the two objects by the detection of the diffracted light beams; and a reference-position detection system comprising an optical system for guiding a detection light beam, other than the diffracted light beams for measurement, which enters at least one of said scale and a photosensor formed in said scale, said reference-position detection system detecting a reference position on said scale on the basis of the detection light beam.

2. An apparatus according to claim 1, wherein said optical system of said reference-position detection system comprises a prism for reflecting a light beam, provided on a surface of said scale opposite to a surface where the diffraction grating is formed as the optical system.

3. An apparatus according to claim 1, wherein said optical system of said reference-position detection system comprises a reflecting surface in the shape of V-grooves, provided on a surface of said scale opposite to a surface where the diffraction grating is formed.

4. An apparatus according to claim 1, wherein the photosensor is disposed at a position on said reference-position detection system corresponding to the reference position on one of (i) a surface of said scale where the diffraction grating is formed and (ii) a surface opposite to the surface of said scale where the diffraction grating is formed.

5. An apparatus according to claim 4, further comprising a mask indicating the reference position formed between the photosensor and the diffraction grating.

6. An apparatus according to claim 4, wherein the photosensor is connected to an interconnection pattern on said scale via bumps.

7. An apparatus according to claim 4, wherein the photosensor is provided at a position on said scale where the detection light beam, other than the diffracted light beams for measurement, is incident after being reflected within said scale.

8. An apparatus according to claim 1, wherein said head unit comprises photosensors and said reference-position detection system is arranged such that the detection light beam, other than the diffracted light beams for measurement, is reflected within said scale and is incident upon said photosensor provided in said head unit.

9. An apparatus according to claim 1, wherein said scale comprises a mask having an aperture at the reference position on a surface where the diffraction grating is formed, and wherein the photosensor detects the detection light beam, other than the diffracted light beams for measurement, when the detection light beam passes through the aperture of the mask.

10. An apparatus according to claim 1, wherein said head unit detects interference light of a plurality of diffracted light beams generated from the diffraction grating.

11. A scale for measuring relative displacement between two objects and used in an optical displacement measuring apparatus for measuring information relating to the relative displacement between the two objects, by projecting a light beam onto a diffraction grating from a head unit provided on one of the two objects and detecting diffracted light beams for measurement from the diffraction grating, said scale comprising:

a scale member comprising the diffraction grating, which is provided on the other one of the two objects; and a reference-position detection system comprising an optical system for guiding a detection light beam, other than diffracted light beams for measurement, which enters at least one of said scale member and a photosensor formed on said scale, said reference-position detection system detecting a reference position on said scale on the basis of the detection light beam, other than the diffracted light beams for measurement.

12. A scale according to claim 11, wherein said optical system of said reference-position detection system comprises a prism for reflecting a light beam, provided on a surface of said scale member opposite to a surface where the diffraction grating is formed.

13. A scale according to claim 11, wherein said optical system of said reference-position detection system comprises a reflecting surface in the shape of V-grooves, provided on a surface of said scale member opposite to a surface where the diffraction grating is formed.

14. A scale according to claim 11, wherein the photosensor is disposed at a position on said reference-position detection system corresponding to the reference position on one of (i) a surface of said scale member where the diffraction grating is formed and (ii) a surface opposite to the surface of said scale member where the diffraction grating is formed.

15. A scale according to claim 14, further comprising a mask indicating the reference position formed between the photosensor and the diffraction grating.

16. A scale according to claim 14, wherein the photosensor is connected to an interconnection pattern on said scale member via bumps.

17. A scale according to claim 14, wherein the photosensor is provided at a position on said scale member where the detection light beams, other than the diffracted light beams for measurement, are incident after being reflected within said scale member.

18. A scale according to claim 11, wherein said head unit comprises photosensors and said reference-position detection system is arranged such that the detection light beams, other than the diffracted light beams for measurement, are reflected within said scale member and are incident upon said photosensor provided in said head unit.

19. A scale according to claim 18, wherein said scale member comprises a mask having an aperture at the reference position on a surface where the diffraction grating is formed, and wherein the photosensor detects the detection light beam, other than the diffracted light beams for measurement, when the detection light beam passes through the aperture of the mask.

20. An optical displacement measuring apparatus for measuring relative displacement between two objects, said apparatus comprising:

a scale provided on one of the two objects, for which relative displacement is to be measured;

a head unit, provided on the other one of the two objects, for (i) projecting a light beam onto said scale, (ii) detecting light beams for measurement from said scale and (iii) measuring information relating to the relative displacement between the two objects by the detection of the light beams; and a reference-position detection system comprising an optical system for guiding a detection light beam, other than the light beams for measurement, which enters at least one of said scale and a photosensor formed on said scale, said reference-position detection system detecting a reference position on said scale on the basis of the detection light beam.

21. An optical displacement measuring apparatus for measuring relative displacement between two objects, said apparatus comprising:

a scale provided on one of the two objects, for which relative displacement is to be measured;

a displacement detecting system, provided on the other one of the two objects for (i) projecting a light beam onto said scale, (ii) detecting light beams for measurement from said scale and (iii) measuring information relating to the relative displacement between the two objects by the detection of the light beams; and a reference-position detection system comprising an optical system provided on said scale for guiding a light beam, other than the light beams for measurement, to a photosensor formed on one of said scale and said displacement detecting system, said reference-position detecting system detecting a reference position on said scale on the basis of detection of the light beam by said photosensor.

22. An apparatus according to claim 21, wherein the light beam other than the light beams for measurement is a beam emitted from said displacement detecting system and split from the light beams for measurement by said scale.

23. An apparatus according to claim 21, wherein said optical system provided on said scale comprises a reflecting surface for reflecting the light beam other than the light beams for measurement formed on said scale.

24. A scale for measuring relative displacement between two objects and used in an optical displacement measuring apparatus for measuring information relating to the relative displacement between the two objects, by projecting a light beam onto the scale from a displacement detecting system provided on one of the two objects and detecting light beams for measurement from said scale, said scale comprising:

a base plate formed as the scale, which is provided on the other one of the two objects; and an optical system provided on said scale for guiding a light beam, other than the light beams for measurement, to a photosensor formed on one of said scale and said displacement detecting apparatus, a reference position on said scale being detected on the basis of a detection of the light beam by said photosensor.

25. A scale according to claim 24, further comprising a diffraction grating provided on said base plate for measuring the information relating to the relative displacement between the two objects.

26. An optical displacement measuring apparatus for measuring relative displacement between two objects, said apparatus comprising:

a scale having a diffraction grating provided on one of the two objects, for which relative displacement is to be measured;

a displacement detecting system, provided on the other one of the two objects, for (i) projecting a light beam onto the diffraction grating, (ii) detecting diffracted light beams for measurement from the diffraction grating and (iii) measuring information relating to the relative displacement between the two objects by the detection of the diffraction light beams; and a reference-position detection system comprising an optical system provided on said scale for guiding a light beam, other than the diffraction light beams for measurement, to a photosensor formed on one of said scale and said displacement detecting system, said reference-position detecting system detecting a reference position on said scale on the basis of a detection of the light beam by said photosensor.

* * * * *

UNITED STATES PATENT AND TRADEMARK OFFICE
CERTIFICATE OF CORRECTION

PATENT NO. : 5,534,693  
DATED : July 9, 1996  
INVENTOR(S) : Hiroshi KONDO, et al.

Page 1 of 2

It is certified that error appears in the above-indentified patent and that said Letters Patent is hereby corrected as shown below:

COLUMN 4:

Line 4, "detection light beam" should read --a detection light beam,--.

COLUMN 6:

Line 4, "is" should be deleted; and  
Line 8, "From" should read --from--.

COLUMN 9:

Line 26, "SA" should read --9A--; and  
Line 55, "$-2\pi X/P-\pi/2.$" should read -- $-2\pi X/P=-\pi/2.$ --.

COLUMN 12:

Line 3, "fellow" should read --reflow--;  
Line 48, "as electric" should read --as an electric--; and  
Line 49, "members" should read --member--.

UNITED STATES PATENT AND TRADEMARK OFFICE
CERTIFICATE OF CORRECTION

PATENT NO. : 5,534,693
DATED : July 9, 1996
INVENTOR(S) : Hiroshi KONDO, et al.

It is certified that error appears in the above-indentified patent and that said Letters Patent is hereby corrected as shown below:

<u>COLUMN 15</u>:

Line 12, "For" should read --for--.

Signed and Sealed this

Nineteenth Day of November, 1996

*Attest:*

BRUCE LEHMAN

*Attesting Officer*  *Commissioner of Patents and Trademarks*